United States Patent
Lin et al.

(10) Patent No.: US 12,075,434 B2
(45) Date of Patent: Aug. 27, 2024

(54) METHOD FOR INFORMATION FEEDBACK, TERMINAL DEVICE AND NETWORK DEVICE

(71) Applicant: GUANGDONG OPPO MOBILE TELECOMMUNICATIONS CORP., LTD., Guangdong (CN)

(72) Inventors: Yanan Lin, Dongguan (CN); Zuomin Wu, Dongguan (CN)

(73) Assignee: GUANGDONG OPPO MOBILE TELECOMMUNICATIONS CORP., LTD., Guangdong (CN)

( * ) Notice: Subject to any disclaimer, the term of this patent is extended or adjusted under 35 U.S.C. 154(b) by 274 days.

(21) Appl. No.: 17/453,367

(22) Filed: Nov. 3, 2021

(65) Prior Publication Data

US 2022/0061034 A1 Feb. 24, 2022

Related U.S. Application Data

(63) Continuation of application No. PCT/CN2019/101151, filed on Aug. 16, 2019.

(51) Int. Cl.
 *H04W 72/23* (2023.01)
(52) U.S. Cl.
 CPC .................................. *H04W 72/23* (2023.01)
(58) Field of Classification Search
 CPC ... H04L 1/1854; H04L 5/0094; H04L 5/0055; H04L 5/0078; H04L 1/0026; H04W 72/23
 See application file for complete search history.

(56) References Cited

U.S. PATENT DOCUMENTS

| | | | |
|---|---|---|---|
| 9,042,277 | B2 | 5/2015 | Chen |
| 2012/0257552 | A1 | 10/2012 | Chen |

(Continued)

FOREIGN PATENT DOCUMENTS

| | | |
|---|---|---|
| CN | 109586877 A | 4/2019 |
| CN | 110121914 A | 8/2019 |

(Continued)

OTHER PUBLICATIONS

First Office Action of the Chinese application No. 202111129865.4, issued on Nov. 28, 2022. 16 pages with English translation.

(Continued)

*Primary Examiner* — Mahran Y Abu Roumi
(74) *Attorney, Agent, or Firm* — Perkins Coie LLP

(57) ABSTRACT

Provided are a method for information feedback, a terminal device and a network device. The method comprises: a terminal device receives first DCI; the terminal device receives second DCI after the first DCI, the downlink channel corresponding to the first DCI and the downlink channel corresponding to the second DCI belonging to the same channel group, the first DCI and the second DCI comprising a time information field, the time information field indicating the time for sending feedback information of the channel group, and the time indicated by the time information field in the first DCI and the time information field in the second DCI being different; and, on the basis of the second DCI, the terminal device determines time information for sending feedback information of the channel group.

9 Claims, 4 Drawing Sheets

(56) References Cited

U.S. PATENT DOCUMENTS

| | | | | |
|---|---|---|---|---|
| 2013/0242815 A1* | 9/2013 | Wang | .................... | H04L 1/1854 370/280 |
| 2019/0363840 A1* | 11/2019 | Wang | .................... | H04L 1/1864 |
| 2023/0370211 A1* | 11/2023 | Wang | .................... | H04L 5/0055 |

FOREIGN PATENT DOCUMENTS

| WO | 2017193268 A1 | 11/2017 |
|---|---|---|
| WO | 2019047019 A1 | 3/2019 |

OTHER PUBLICATIONS

Office Action of the Indian application No. 202117053040, issued on Apr. 7, 2022. 6 pages with English translation.
Huawei et al:"Discussion on DRX with cross-COT HARQ feedback", 3GPP Draft·R2-1907744, vol. RAN WG2, No. Reno, Nevada, US; Apr. 13, 2019-May 17, 2019 May 13, 2019 (May 13, 2019), XP051731175. 5 pages.
Qualcomm Incorporated:"Enhancements to Scheduling and HARQ operation for NR-U", 3GPP Draft; R1-1907263 7.2.2.2.3, vol. RAN WG1, No. Reno, US; May 13, 2019-May 17, 2019 May 13, 2019 (May 13, 2019), XP051728703. 12 pages.
Supplementary European Search Report in European application No. 19942537.2, mailed on Jun. 22, 2022. 9 pages.
Written Opinion of the International Search Authority in the international application No. PCT/CN2019/101151, mailed on Apr. 26, 2020. 9 pages with English translation.
International Search Report in the international application No. PCT/CN2019/101151, mailed on Apr. 26, 2020.
First Office Action of the European application No. 19942537.2, issued on Feb. 22, 2023. 5 pages.
Second Office Action of the European application No. 19942537.2, issued on Jul. 14, 2023. 5 pages.
3GPP TSG RAN WG1 #96bis R1-1904408, Xi'an, China, Apr. 8-12, 2019, Agenda item: 7.2.2.2.3, Source: Samsung, Title: HARQ enhancements for NR-U, Document for: Discussion and Decision. the whole document. 9 pages.
First Office Action of the Japanese application No. 2021-576920 issued on Jul. 4, 2023. 8 pages with English translation.
First Office Action of the Vietnamese application No. 1-2021-08009, issued on Sep. 25, 2023, 4 pages with English translation.
Fujitsu: "On DL signals and channels for NR-U", 3GPP Draft; R1-1906431 On DL Signals and Channels for NR-U, BRD Generation Partnership Project (3GPP), Mobile Competence Centre; 650, Route Des Lucioles; F-06921 Sophia-Antipolis Cedex; France. vol. RAN WG1, No. Reno, USA; May 13, 2019-May 17, 2019, May 13, 2019 (May 13, 2019), XP051727881, the whloe document, 5 pages.
Nokia et al: "On the Frame structure and Wideband operation for NR-U", 3GPP Draft; R1-1812697_Frame Structure and WB Operation_Nok, BRD Generation Partnership Project (3GPP), Mobile Compentence Centre; 650, Route Des Lucioles ;F-06921 Sophia-Antipolis Cedex ; France, vol. RAN WG1, No. Spokane, USA; Nov. 12, 2018-Nov. 16, 2018, Nov. 11, 2018 (Nov. 11, 2018), XP051554656, the whloe document, 14 pages.
Third Office Action of the European application No. 19942537.2, issued on Nov. 6, 2023, 6 pages.
Oral Proceedings of the European application No. 19942537.2, issued on May 6, 2024. 7 pages.

* cited by examiner

METHOD FOR INFORMATION FEEDBACK, TERMINAL DEVICE AND NETWORK DEVICE

CROSS-REFERENCE TO RELATED APPLICATION

The present application is a continuation of International Application No. PCT/CN2019/101151 filed on Aug. 16, 2019, the disclosure of which is hereby incorporated by reference in its entirety.

TECHNICAL FIELD

Embodiments of the present disclosure relate to the field of communications, and particularly, to a method for information feedback, a terminal device and a network device.

RELATED ARTS

In the New Radio (NR) system, when Hybrid Automatic Repeat reQuest (HARQ) feedback is performed, feedback can be performed based on a physical downlink shared channel (PDSCH) group. A network device may indicate information of the PDSCH group, and when the feedback information of the PDSCH group is triggered, ACK/NACK information for the PDSCH group needs to be fed back together. At this time, how to realize an effective transmission of the feedback information of the PDSCH group has become an urgent problem to be solved.

SUMMARY

The present disclosure provides a method for information feedback, a terminal device and a network device.

In a first aspect, there is provided a method for information feedback, including: a terminal device receives first Downlink Control Information (DCI); the terminal device receives second DCI after the first DCI, where a downlink channel corresponding to the first DCI and a downlink channel corresponding to the second DCI belong to a same channel group, and each of the first DCI and the second DCI includes a time information field, the time information field is used to indicate a time for transmitting feedback information of the channel group, a value indicated by the time information field in the first DCI is an invalid value, and the time information field in the second DCI is used to indicate a second time unit; and the terminal device determines time information for transmitting the feedback information of the channel group according to the second DCI.

In a second aspect, there is provided a terminal device. The terminal device can execute the method in the first aspect or in any possible implementation of the first aspect. Specifically, the terminal device may include functional modules for executing the method in the first aspect or in any possible implementation of the first aspect.

In a third aspect, there is provided a network device. The network device can execute the method in the second aspect or in any possible implementation of the second aspect. Specifically, the network device may include functional modules for executing the method in the second aspect or in any possible implementation of the second aspect.

DETAILED DESCRIPTION

The technical solutions in the embodiments of the present disclosure will be described below with reference to the accompanying drawings.

The technical solutions of the embodiments of the present disclosure may be applied to various communication systems, such as a Global System of Mobile Communication (GSM), a Code Division Multiple Access (CDMA) system, a Wideband Code Division Multiple Access (WCDMA) system, a Long Term Evolution (LTE) system, an LTE Frequency Division Duplex (FDD) system, an LTE Time Division Duplex (TDD) system, an Advanced long term evolution (LTE-A) system, a New Radio (NR) system, an NR system evolution system, an LTE-based access to unlicensed spectrum (LTE-U) on unlicensed spectrum system, an NR-based access to unlicensed spectrum (NR-U) system, an Universal Mobile Telecommunication System (UMTS), a Wireless Local Area Network (WLAN), a Wireless Fidelity (WiFi), and a future 5G systems or other communication systems, etc.

Generally speaking, traditional communication systems support a limited number of connections and are easy to implement. However, with the development of communication technology, mobile communication systems will not only support traditional communication, but also support Device to Device (D2D) communication, Machine to Machine (M2M) communication, Machine Type Communication (MTC), and Vehicle to Vehicle (V2V) communication, etc. The embodiments of the present disclosure can also be applied to these communication systems.

The communication system in the embodiment of the present disclosure can be applied to a carrier aggregation (CA) scenario, a dual connectivity (DC) scenario, a stand-alone (SA) network deployment scenario, and the like.

Figure 1:
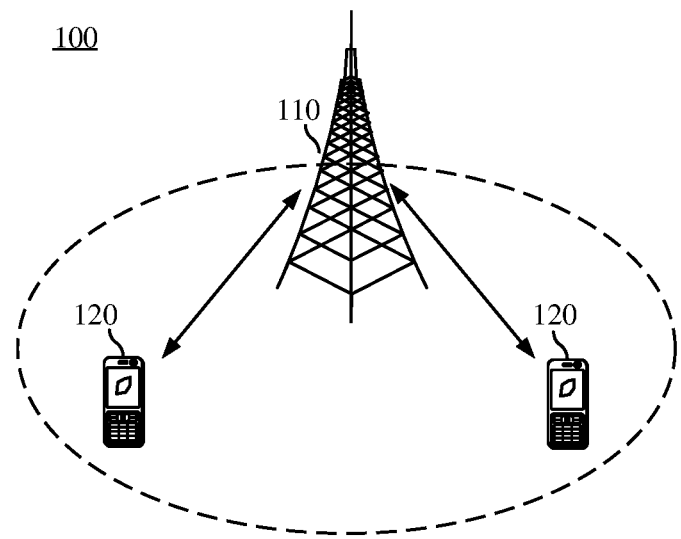
FIG. 1 is a schematic diagram of a possible wireless communication system applied by an embodiment of the present disclosure.

Exemplarily, a communication system 100 applied in the embodiment of the present disclosure is shown in FIG. 1. The communication system 100 may include a network device 110, and the network device 110 may be a device that communicates with a terminal device 120 (or called a communication terminal or a terminal). The network device 110 may provide communication coverage for a specific geographic area, and may communicate with terminal devices located in the coverage area.

In an embodiment, the network device 110 may be a Base Transceiver Station (BTS) in a GSM system or a CDMA system, or a NodeB (NB) in a WCDMA system, an Evolutional Node B (eNB or eNodeB) in an LTE system, or a wireless controller in the Cloud Radio Access Network (CRAN), or the network device may be a mobile switching center, a relay station, an access point, an in-vehicle device, a wearable device, a hub, a switch, a bridge, a router, a network-side device in 5G networks or a network device in the future enhanced Public Land Mobile Network (PLMN), etc.

The wireless communication system 100 further includes at least one terminal device 120 located within the coverage area of the network device 110. The terminal device 120 may be mobile or fixed. In an embodiment, the terminal device 120 may refer to user equipment, an access terminal, a user unit, a user station, a mobile station, a remote station, a remote terminal, a mobile device, a user terminal, a terminal, a wireless communication device, a user agent, or user equipment. The terminal device can also be a cellular phone, a cordless phone, a Session Initiation Protocol (SIP) phone, a wireless local loop (WLL) station, a personal digital assistant (PDA), handheld devices with wireless communication functions, computing devices or other processing devices connected to wireless modems, in-vehicle devices, wearable devices, terminal devices in 5G networks, or terminal devices in the future enhanced Public Land Mobile Network (PLMN) etc., which are not limited in the embodiment of the present disclosure. In an embodiment, direct terminal connection (Device to Device, D2D) communication may also be performed between the terminal devices 120.

The network device 110 may provide services for a cell, and the terminal device 120 communicates with the network device 110 through transmission resources used by the cell, such as frequency domain resources, or spectrum resources. The cell may be a cell corresponding to the network device 110. The cell may belong to a macro base station or a base station corresponding to a small cell. The small cell here may include Metro cell, Micro cell, Pico cell, Femto cell, etc. These small cells have the characteristics of small coverage and low transmit power, and are suitable for providing high-rate data transmission services.

FIG. 1 exemplarily shows one network device and two terminal devices, but the present disclosure is not limited to this. The wireless communication system 100 may include a plurality of network devices, and the coverage area of each network device may include other numbers of terminal devices. In addition, the wireless communication system 100 may also include other network entities such as a network controller and a mobility management entity.

Unlicensed spectrum is a spectrum that can be used for radio device communications specified by countries and regions. The unlicensed spectrum is usually considered to be a shared spectrum. That is to say, communication devices in different communication systems can use the unlicensed spectrum without the need of applying for a proprietary spectrum authorization from the government, as long as regulatory requirements set by the countries or regions are meet. In order to allow various communication systems that use the unlicensed spectrum for wireless communication to coexist friendly on the unlicensed spectrum, some countries or regions have stipulated the legal requirements that must be met when using the unlicensed spectrum. For example, in some regions, communication devices follow a "Listen Before Talk (LBT)" principle. That is to say, communication devices need to perform channel monitoring before transmitting signals on channels of the unlicensed spectrum. If the monitoring result is that the channel is idle, the communication devices can transmit signals; or if the monitoring result of the communication devices on channels on the unlicensed spectrum is that the channel is busy, the communication devices cannot transmit signals. In order to ensure fairness, in one transmission, the time that a communication device uses a channel of the unlicensed spectrum for signal transmission cannot exceed a maximum channel occupation time (MCOT).

In an LBT mechanism, once a transmitting terminal succeeds in preempting a channel, it should occupy continuous resources as much as possible for data transmission. A receiving terminal should perform multiplexing transmission of Acknowledgement (ACK)/Negative Acknowledgement (NACK) as much as possible to occupy a small number of time-frequency resources, thereby avoiding unnecessary LBT processes.

At present, it is possible to determine a HARQ feedback timing dynamically. The terminal device determines a preconfigured HARQ feedback timing set, such as {k1, k2, . . . , kn}, and the network device uses the HARQ feedback timing indication information in the DCI to indicate a value $ki$ in the set to the terminal device, where, $1 \leq ki \leq n$. If a PDSCH scheduled by downlink control information (DCI) is transmitted in time slot n, then the feedback information of the PDSCH is transmitted in time slot n+ki. The HARQ feedback timing set may include at most, for example, 8 values. For DCI format 1_0, the HARQ feedback timing set can be agreed upon by a protocol, and for DCI format 1_1, the set can be configured by the network device.

In addition, in the NR-based Access to Unlicensed Spectrum system, the HARQ feedback timing is allowed to be a special value which is used to indicate that a transmission time and a transmission resource of the ACK/NACK of the PDSCH scheduled by the DCI cannot be determined temporarily. The network device can subsequently trigger the terminal device to transmit the ACK/NACK of the PDSCH through other indication information. For example, dedicated downlink control signaling, downlink control signaling for scheduling the PSCH, or downlink control signaling for scheduling PDSCH, etc., can be used to trigger the terminal device to transmit the feedback information of the previous PDSCH. In addition, in order to support the aforementioned HARQ feedback method, the terminal device is allowed to perform feedback based on the PDSCH group. The network device is used to indicate the information of the PDSCH group through the DCI, thereby triggering the terminal device to transmit feedback information of a certain group of PDSCH, and feedback information of all PDSCH in the PDSCH group needs to be transmitted.

However, a new problem is introduced. On the one hand, the value ki indicated in the HARQ feedback timing indication information cannot be changed, after the special value of the HARQ feedback timing, i.e. an invalid value, is introduced, in a same PDSCH group, if the value of the HARQ feedback timing corresponding to a part of the PDSCH is valid, whereas the value of the HARQ feedback timing corresponding to another part of the PDSCH is invalid, at this time, how to transmit the feedback information of this PDSCH group becomes a problem that needs to be considered. On the other hand, because in the NR-U system, transmission resources rely on LBT, once the transmitting terminal successfully occupies a channel, it should occupy continuous resources as much as possible for data transmission. However, the current feedback method will cause downlink resources not continuous due to frequent transmission of feedback information, thereby reducing system efficiency.

To this end, the embodiment of the present disclosure provides a method for information feedback, which can realize effective transmission of feedback information of a channel group.

Figure 2:
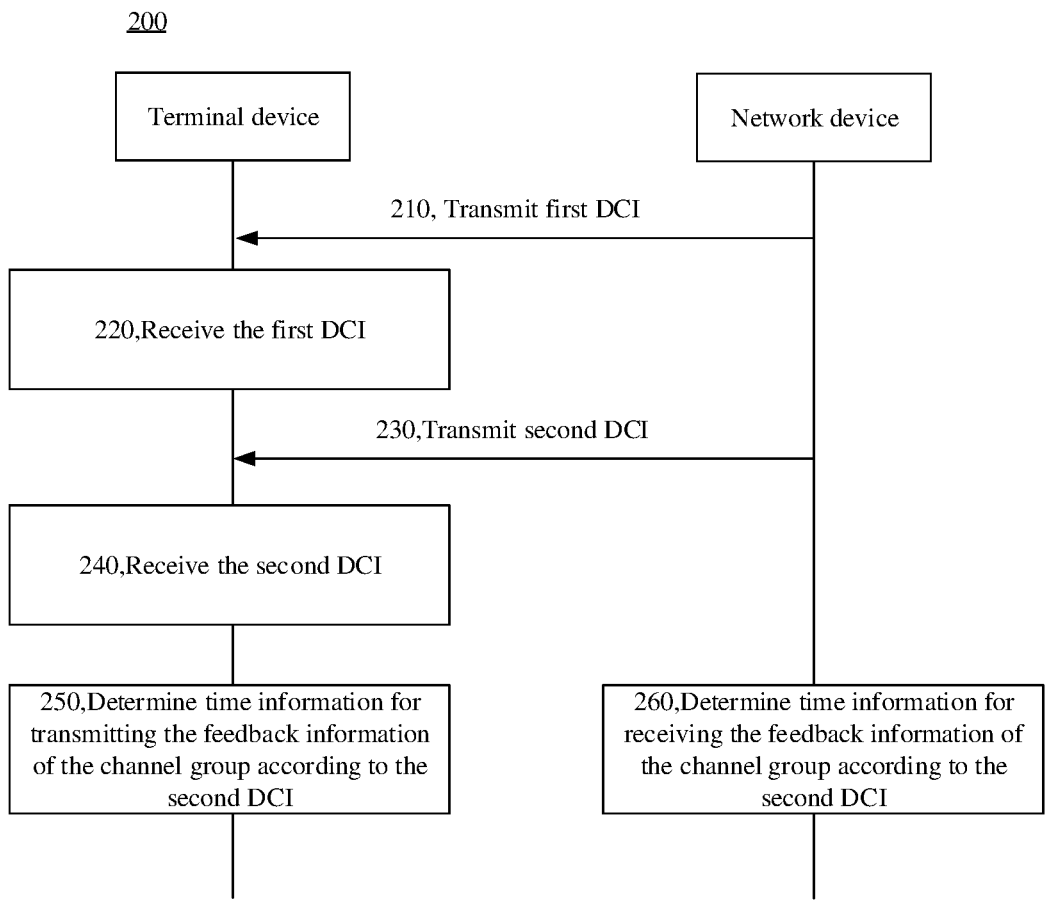
FIG. 2 is an interactive flowchart of a method for information feedback according to an embodiment of the present disclosure.

FIG. 2 is an interactive flowchart of a method for information feedback according to an embodiment of the present disclosure. The method can be performed by a network device and a terminal device. The network device may be, for example, the network device 110 shown in FIG. 1, and the terminal device may be, for example, the terminal device 120 shown in FIG. 1. As shown in FIG. 2, the method 200 includes some or all of the following operations.

In 210, the network device transmits first DCI.

In 220, the terminal device receives the first DCI.

In 230, the network device transmits second DCI after the first DCI.

In 240, the terminal device receives the second DCI after the first DCI.

A downlink channel corresponding to the first DCI and a downlink channel corresponding to the second DCI belong to a same channel group, and each of the first DCI and the second DCI includes a time information field, the time information field is used to indicate a time for transmit feedback information of the channel group, a time indicated by the time information field in the first DCI is different from a time indicated by the time information field in the second DCI.

In 250, the terminal device determines time information for transmitting feedback information of the channel group according to the second DCI.

In 260, the network device determines time information for receiving feedback information of the channel group according to the second DCI.

In the embodiment of the present disclosure, the network device has transmitted first DCI and second DCI to the terminal device. Due to that a time indicated by the time information field in the first DCI may be different from a time indicated by the time information field in the second DCI, the terminal device determines time information for transmitting the feedback information of the channel group based on the second DCI.

In other words, when downlink channels corresponding to the first DCI and the second DCI that are transmitted sequentially belong to a same channel group, and the time indicated by the time information fields in these two DCIs is different, the time information of the feedback information of the channel group can be determined based on the second DCI, thus an effective transmission of the feedback information of the channel group can be realized based on these time information. Since the time indicated by the time information field in the preceding first DCI is allowed to be updated through the succeeding second DCI, more flexible feedback is realized.

The feedback information of the channel group includes ACK information or NACK information corresponding to the downlink channel in the channel group.

It should be understood that the time information configured for transmitting the feedback information of the channel group includes not only the time for the terminal device to transmit the feedback information of the channel group, that is, the time unit at which the terminal device should transmit the feedback information; but also includes the time that the terminal device does not need to transmit the feedback information of the channel group, that is, the time at which the feedback information of the channel group does not need to be transmitted.

In addition, in the embodiment of the present disclosure, the downlink channel corresponding to the first DCI includes, for example, the downlink channel scheduled by the first DCI or the downlink channel for transmitting the first DCI, and the downlink channel corresponding to the second DCI includes, for example, the downlink channel scheduled by the second DCI or the downlink channel for transmitting the second DCI.

In other words, the terminal device may feedback the physical downlink control channel (PDCCH) where the first DCI and the second DCI are located. The terminal device transmits feedback information of the PUCCH where the first DCI is located and the PUCCH where the second DCI is located to the network device. The PUCCH where the first DCI is located and the PUCCH where the second DCI is located belong to the same PUCCH group.

In an embodiment, the terminal device may also feedback the PDSCH scheduled by the first DCI and the second DCI. The terminal device transmits feedback information of the PDSCH scheduled by the first DCI and the PDSCH scheduled by the second DCI to the network device. The PDSCH scheduled by the first DCI and the PDSCH scheduled by the second DCI belong to the same PDSCH group.

The network device may indicate the information of the channel group to which the downlink channel corresponding to the first DCI and the downlink channel corresponding to second DCI belong, to the terminal device through the DCI. For example, the first DCI and the second DCI may include a channel group information field, or called PDSCH-to-HARQ_feedback timing indicator information field, where the channel group information field in the first DCI is used to indicate the channel group to which the downlink channel corresponding to the first DCI belongs, and the channel group information field in the second DCI is used to indicate the channel group to which the downlink channel corresponding to the second DCI belongs. Here, the channel group information fields in the first DCI and the second DCI indicate the same channel group.

The time information field in the first DCI and the time information field in the second DCI may indicate valid time or invalid time. For example, if the time information field in the first DCI is used to indicate a first time unit, it means that the terminal device can transmit feedback information of the channel group on the first time unit; if the time indicated by the time information field in the first DCI is invalid, it means that the time for transmitting the feedback information of the channel group has not yet been determined, and there is currently no suitable time and resources for transmitting the feedback information. For another example, if the time information field in the second DCI is used to indicate a second time unit, it means that the terminal device can transmit feedback information of the channel group on the second time unit; if the time indicated by the time information field in the second DCI is invalid, it means that the time for transmitting the feedback information of the channel group has not yet been determined, and there is currently no suitable time and resources to transmit the feedback information. When the content of the time information field is a specific value, it means that the time indicated by the time information field is invalid.

In the following, these situations are described separately.

Firstly, it is described how the terminal device processes the feedback information when the time information field in the second DCI is used to indicate the second time unit. That is, the time information field in the second DCI is used to indicate that the time is valid.

In an embodiment, in 250, the operation that the terminal device determines time information for transmitting the feedback information of the channel group according to the second DCI includes that the terminal device determines to transmit the feedback information of the channel group on the second time unit.

The feedback information of the channel group transmitted on the second time unit includes feedback information of downlink channel corresponding to the first DCI and feedback information of downlink channel corresponding to the second DCI.

Correspondingly, in 260, the operation that the network device determines the time information for receiving the feedback information of the channel group according to the second DCI includes that the network device determines to receive the feedback information of the channel group on the second time unit.

The feedback information of the channel group received on the second time unit includes feedback information of downlink channel corresponding to the first DCI and feedback information of downlink channel corresponding to the second DCI.

In this embodiment, the time indicated by the time information field in the second DCI is valid. Therefore, the terminal device can transmit the feedback information of the channel group according to the time indicated by the time information field in the second DCI, that is, the feedback information of the channel group is transmitted in the second time unit.

At this time, regardless of whether the time indicated by the time information field in the first DCI is valid or invalid, the terminal device may transmit the feedback information of the channel group according to the second time unit indicated by the time information field in the second DCI.

Figure 3:
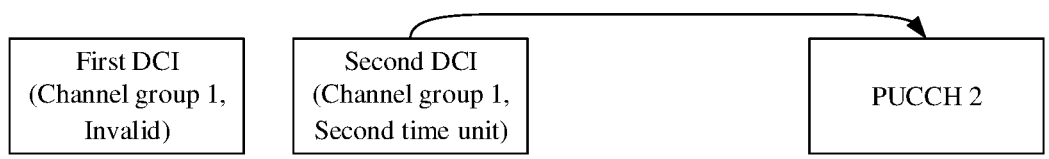
FIG. 3 is a schematic diagram of a possible implementation based on the method shown in FIG. 2.

For example, as shown in FIG. 3, the terminal device receives the first DCI and receives the second DCI after the first DCI, where the time indicated by the time information field in the first DCI is invalid, and the time information field in the second DCI is used to indicate the second time unit. Since the time information field in the second DCI is used to indicate the second time unit, the terminal device transmits PUCCH 2 on the second time unit, and the network device receives PUCCH 2 on the second time unit, where PUCCH 2 includes feedback information of the channel group. The feedback information of the channel group carried in PUCCH 2 includes the feedback information of the downlink channel corresponding to the first DCI and the feedback information of the downlink channel corresponding to the second DCI. In addition, if there are downlink channels belonging to a same channel group before the first DCI, the feedback information of the channel group transmitted in PUCCH 2 further includes the feedback information of these downlink channels.

When the time indicated by the time information field in the second DCI is valid, if the time indicated by the time information field in the first DCI is also valid, in an embodiment, the terminal device may further determine whether the feedback information of the channel group needs to be transmitted on the first time unit indicated by the time information field in the first DCI.

In an embodiment, in 250, the operation that the terminal device determines the time information used for transmitting the feedback information of the channel group according to the second DCI further includes that the terminal device determines whether to transmit the feedback information of the channel group on the first time unit according to a time interval between a time resource used for receiving the second DCI and the first time unit.

The time resource is located before the first time unit. That is, the terminal device receives the second DCI before the arrival of the first time unit.

Correspondingly, in 260, the operation that the network device determines the time information for receiving the feedback information of the channel group according to the second DCI further includes that the network device determines whether to receive the feedback information of the channel group on the first time unit according to a time interval between the time resource and the first time unit.

Taking the terminal device as an example, since the time indicated by the time information field in the first DCI and the second DCI is both valid, the terminal device can transmit the feedback information of the channel group on the second time unit indicated by the time information field of the second DCI. Furthermore, since there exists the first time unit, the terminal device also needs to determine whether the transmission of the feedback information on the first unit needs to be suspended. The terminal device may determine whether to transmit the feedback information of the channel group on the first time unit according to the time interval between the time resource used for transmitting the second DCI and the first time unit.

The time interval may refer to, for example, the length of time between the end time of the time resource and the start time of the first time unit.

For example, if the time interval is less than a preset value, the terminal device determines to transmit the feedback information of the channel group on the first time unit. Correspondingly, the network device determines to receive the feedback information of the channel group on the first time unit. The feedback information of the channel group transmitted on the first time unit includes feedback information of the downlink channel corresponding to the first DCI.

For another example, if the time interval is greater than or equal to a preset value, the terminal device determines not to transmit feedback information of the channel group on the first time unit. Correspondingly, the network device determines not to receive the feedback information of the channel group on the first time unit.

The preset value may be configured by the network device or agreed upon by a protocol.

For example, as shown in FIG. 4(*a*) and FIG. 4(*b*), the terminal device receives the first DCI and receives the second DCI after the first DCI, where the time information field in the first DCI is used to indicate the first time unit, the time information field in the second DCI is used to indicate the second time unit. The channel group information field of the first DCI and the channel group information field of the second DCI indicate the same channel group 1. The terminal device may transmit PUCCH 2 on the second time unit, and the network device receives PUCCH 2 on the second time unit, where PUCCH 2 includes the feedback information of the channel group. The feedback information of the channel group carried in PUCCH 2 includes the feedback information of the downlink channel corresponding to the first DCI and the feedback information of the downlink channel corresponding to the second DCI. In addition, if there are downlink channels belonging to the same channel group before the first DCI, the feedback information of the channel group transmitted in PUCCH 2 further includes the feedback information of these downlink channels.

Figure 4A:
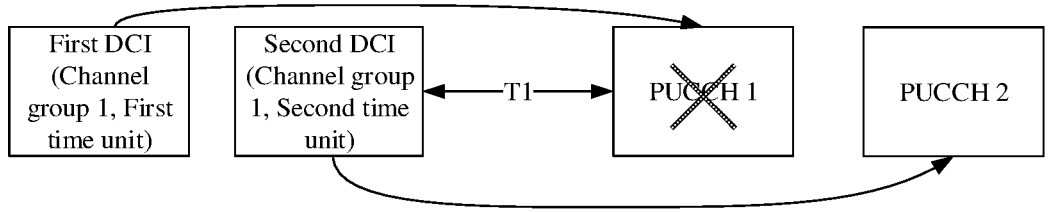
FIG. 4(a) and FIG. 4(b) are schematic diagrams of a possible implementation based on the method shown in FIG. 2.
Figure 4B:
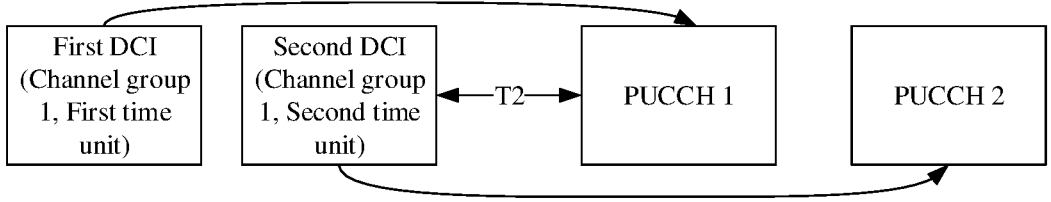

Further, the terminal device determines whether to stop the transmission of the feedback information in the first time unit according to a time interval between a time resource used for transmitting the second DCI and the first time unit indicated by the time information field in the first DCI. As shown in FIG. 4 (a), the time interval between the second DCI and the first time unit is T1, and if T1 is greater than the preset value, the terminal device determines that PUCCH 1 does not need to be transmitted on the first time unit. As shown in FIG. 4(b), the time interval between the second DCI and the first time unit is T2, and if T2 is less than the preset value, the terminal device determines that PUCCH 1 still needs to be transmitted on the first time unit. The feedback information of the channel group is carried in PUCCH 1.

The preset value may be, for example, the processing time required for the terminal device to cancel transmission of feedback information on the first time unit, which includes the time required for the terminal device to demodulate and decode DCI, and the time required to stop PUCCH transmission.

This will be described in conjunction with FIG. 4 (a) and FIG. 4 (b). As shown in FIG. 4 (a), the time interval between the second DCI and the first time unit is T1, and T1 is greater than the preset value. That is, within the time period of T1, the terminal device has enough time to demodulate and decode the second DCI to obtain the position of the second time unit indicated by the time information field in the second DCI, and cancel the transmission of PUCCH 1. At this time, the terminal device transmits the feedback information of the channel group on the second time unit, and does not need to transmit the feedback information of the channel group on the first time unit. In this way, the discontinuity of downlink resources caused by repeated transmitting of feedback information is avoided, and unnecessary LBT is avoided.

As shown in FIG. 4 (b), the time interval between the second DCI and the first time unit is T2, and T2 is less than the preset value. In other words, within the time period of T2, the terminal device cannot complete the demodulation and decoding of the second DCI and the cancellation of PUCCH 1. At this time, in order for the network device to obtain the feedback information as soon as possible, the terminal device may transmit the feedback information of the channel group on the first time unit. At this time, the PUCCH 1 transmitted on the first time unit includes the feedback information of the downlink channel corresponding to the first DCI, but does not include the feedback information of the downlink channel corresponding to the second DCI. In addition, if there are downlink channels belonging to the same channel group before the first DCI, the feedback information of the channel group transmitted in PUCCH 1 further includes the feedback information of these downlink channels.

It should be understood that if the terminal device determines to transmit the feedback information of the channel group on the second time unit, the feedback information of the channel group may not only include the feedback information of the downlink channel corresponding to the first DCI and the feedback information of the downlink channel corresponding to the second DCI, but also include feedback information of other downlink channels that are located before the first DCI and belong to the channel group. If the terminal device determines to transmit the feedback information of the channel group on the first time unit, in addition to the feedback information of the downlink channel corresponding to the first DCI, the feedback information of the channel group may further include the feedback information of other downlink channels that are located before the first DCI and belong to the channel group.

In other words, the terminal device can transmit the feedback information of the channel group multiple times on different time units, but in the transmitted feedback information of the channel group, the number of feedback information of downlink channels belonging to the same channel group can be continuously increased each time. For example, the first time unit indicated by the time information indication field of the first DCI may be used to transmit the feedback information of the downlink channel corresponding to the first DCI and the feedback information of the downlink channel corresponding to the DCI before the first DCI. The second time unit indicated by time information indication field of the second DCI may be used to transmit the feedback information of the downlink channel corresponding to the second DCI and the feedback information of the downlink channel corresponding to the DCI before the second DCI.

Next, it is described how the terminal device processes the feedback information when the time information field in the first DCI is used to indicate the first time unit. That is, the time information field in the first DCI is used to indicate that the time is valid.

In an embodiment, in 250, the operation that the terminal device determines the time information used for transmitting the feedback information of the channel group according to the second DCI includes that the terminal device determines whether to transmit the feedback information of the channel group on the first time unit according to the time interval between a time resource used for receiving the second DCI and the first time unit.

The time resource is located before the first time unit. That is, the terminal device receives the second DCI before the arrival of the first time unit.

Correspondingly, in 260, the operation that the network device determines the time information used for receiving the feedback information of the channel group according to the second DCI, includes that the network device determines whether to receive the feedback information of the channel group on the first time unit according to a time interval between a time resource used for receiving the second DCI and the first time unit.

Taking the terminal device as an example, since the time indicated by the time information field in the first DCI is valid and the terminal device receives second DCI before the first time unit, the terminal device needs to determine whether to suspend the transmission of feedback information in the first unit. The terminal device may determine whether to transmit the feedback information of the channel group on the first time unit according to the time interval between the time resource used for transmitting the second DCI and the first time unit.

For example, if the time interval is less than a preset value, the terminal device determines to transmit the feedback information of the channel group on the first time unit. Correspondingly, the network device determines to receive the feedback information of the channel group on the first time unit. The feedback information of the channel group transmitted on the first time unit includes feedback information of the downlink channel corresponding to the first DCI.

For another example, if the time interval is greater than or equal to the preset value, the terminal device determines not to transmit feedback information of the channel group on the first time unit. Correspondingly, the network device determines not to receive the feedback information of the channel group on the first time unit.

The preset value may be configured by the network device or agreed upon by a protocol.

Figure 5A:
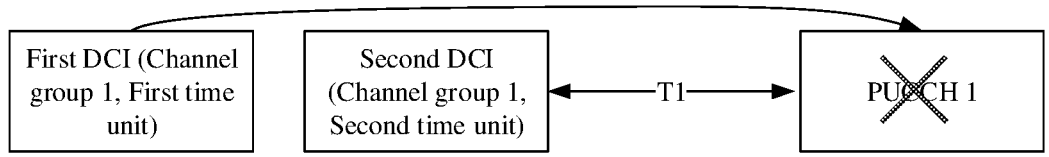
FIG. 5(a) and FIG. 5(b) are schematic diagrams of a possible implementation based on the method shown in FIG. 2.
Figure 5B:
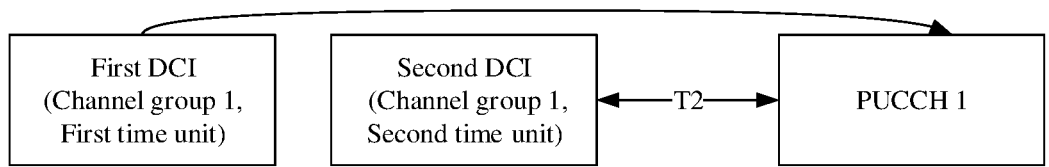

For example, as shown in FIG. 5(a) and FIG. 5(b), the terminal device receives the first DCI and the time information field in the first DCI is used to indicate the first time unit, but the terminal device receives the second DCI before the first time unit. In addition, the channel group information field of the second DCI and the channel group information field of the first DCI indicate the same channel group 1. The terminal device determines whether the feedback information of the channel group needs to be transmitted on the first time unit according to the time interval between the second DCI and the first time unit. As shown in FIG. 4(a), the time interval between the second DCI and the first time unit is T1, and if T1 is greater than the preset value, the terminal device determines not to transmit PUCCH 1 on the first time unit. As shown in FIG. 4(b), the time interval between the second DCI and the first time unit is T2. If T2 is less than the preset value, the terminal device determines that PUCCH 1 still needs to be transmitted on the first time unit. The feedback information of the channel group is carried in PUCCH 1.

The preset value may be, for example, the processing time required for the terminal device to cancel transmission of feedback information on the first time unit, which includes the time required for the terminal device to demodulate and decode DCI, and the time required to stop PUCCH transmission.

This will be described in conjunction with FIG. 5 (a) and FIG. 5(b). As shown in FIG. 5(a), the time interval between the second DCI and the first time unit is T1, and T1 is greater than the preset value. That is, in the time period of T1, the terminal device has enough time to demodulate and decode the second DCI to obtain the content in the time information field in the second DCI, and cancel the transmission of PUCCH 1. At this time, the terminal device does not need to transmit the feedback information of the channel group on the first time unit, and process the feedback information according to the second DCI. In this way, the discontinuity of downlink resources caused by repeated transmitting of feedback information is avoided, and unnecessary LBT is avoided.

As shown in FIG. 5(b), the time interval between the second DCI and the first time unit is T2, and T2 is less than the preset value. In other words, within the time period of T2, the terminal device cannot complete the demodulation and decoding of the second DCI and the cancellation of PUCCH 1. At this time, in order for the network device to obtain the feedback information as soon as possible, the terminal device may transmit the feedback information of the channel group on the first time unit. At this time, the PUCCH 1 transmitted on the first time unit includes the feedback information of the downlink channel corresponding to the first DCI, but does not include the feedback information of the downlink channel corresponding to the second DCI. In addition, in addition to the feedback information of the downlink channel corresponding to the first DCI, the feedback information of the channel group may also include feedback information of other downlink channels that are located before the first DCI and belong to the channel group.

At this time, regardless of whether the time indicated by the time information field in the second DCI is valid or invalid, the terminal device can determine whether to transmit the feedback information of the channel group on the first time unit according to the time interval between the second DCI and the first time unit.

For example, as shown in FIG. 5(a) and FIG. 5(b), the time indicated by the time information field in the second DCI may be invalid. For another example, as shown in FIG. 4(a) and FIG. 4(b), the time indicated by the time information field in the second DCI may be valid.

For example, in several possible implementation of the embodiment of the present disclosure, when the time indicated by the time information field in the first DCI and the time indicated by the time information field in the second DCI are both valid, the terminal device may transmit the feedback information of the channel group on the second time unit indicated by the time information field in the second DCI, and further determine whether the feedback information of the channel group needs to be transmitted on the first time unit according to the time interval between the first time unit indicated by the time information field in the first DCI and the second DCI. When the time indicated by the time information field in the first DCI is valid, and the time indicated by the time information field in the second DCI is invalid, the terminal device determines whether to transmit feedback information of the channel group on the first time unit according to the time interval between the first time unit and the second DCI. When the time indicated by the time information field in the first DCI is invalid, and the time indicated by the time information field in the second DCI is valid, the terminal device can transmit the feedback information of the channel group on the second time unit. When the time indicated by the time information field in the first DCI and the time indicated by the time information field in the second DCI are both invalid, the terminal device temporarily does not transmit the feedback information of the channel group.

It can be seen that in the embodiment of the present disclosure, the channel group information fields in the two DCIs received by the terminal device indicate the same channel group, and the time information fields in the two DCIs indicate different times, the terminal device can determine the time-related information used for transmitting the feedback information of the channel group according to the content in the time information field in the succeeding second DCI. For example, the time for transmitting the feedback information of the channel group is determined according to the second DCI, and it is determined according to the second DCI whether the feedback information of the channel group still needs to be transmitted within the time indicated by the time information field in the previous first DCI. On the one hand, such an information feedback method allows the time indicated by the time information field in the first DCI to be updated through the second DCI, so that the feedback time can be changed, which achieves more flexible feedback and increases the flexibility of scheduling. On the other hand, since the terminal device does not need to feedback at the time indicated by the time information field in all DCIs, the number of times that the terminal device transmits feedback information is reduced, the discontinuity of downlink resources in the NR-U system is reduced, and effectiveness of the system is improved.

Each example in the embodiments of the present disclosure takes a terminal device as an example to describe how the terminal device determines the time information for transmitting the feedback information of the channel group. For how the network device determines the time information used for receiving the feedback information of the channel group, refer to the related description about the terminal device determining the time information. For brevity, details are not repeated here.

It should be noted that, under the premise of no conflict, the various embodiments described in the present disclosure and/or the technical features in each embodiment can be combined with each other arbitrarily, and the technical solutions obtained after the combination should also fall within the protection scope of the present disclosure.

In the various embodiments of the present disclosure, the sequence number of the above-mentioned processes does not mean the order of performance. The performance order of each process should be determined by its function and internal logic, and should not constitute any limit to the implementation process of the embodiments of the present disclosure.

The method for downlink signal transmission according to the embodiment of the present disclosure is described in detail above. The apparatus according to the embodiment of the present disclosure will be described below in conjunction with FIG. 6 to FIG. 10. The technical features described in the method embodiment are applicable to the following apparatus embodiments.

Figure 6:
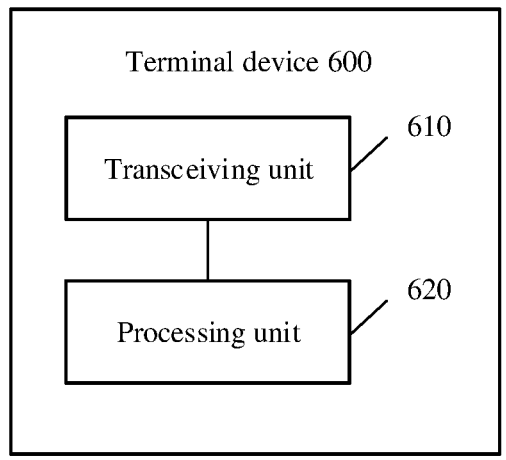
FIG. 6 is a schematic block diagram of a terminal device according to an embodiment of the present disclosure.

FIG. 6 is a schematic block diagram of a terminal device 600 according to an embodiment of the present disclosure. As shown in FIG. 6, the terminal device 600 includes a transceiving unit 610 and a processing unit 620.

The transceiving unit 610 is configured to receive first DCI.

The transceiving unit 610 is further configured to receive second DCI after the first DCI, where a downlink channel corresponding to the first DCI and a downlink channel corresponding to the second DCI belong to a same channel group, and each of the first DCI and the second DCI includes a time information field, the time information field is used to indicate a time for transmitting feedback information of the channel group, a time indicated by the time information field in the first DCI is different from a time indicated by the time information field in the second DCI.

The processing unit 620 is configured to determine according to the second DCI received by the transceiving unit 610, time information for transmitting the feedback information of the channel group.

Therefore, when the downlink channels corresponding to the first DCI and the downlink channels corresponding to the second DCI transmitted successively belong to the same channel group, and the time indicated by the time information fields in these two DCIs are different, the time information used for transmitting feedback information of the channel group can be determined based on the second DCI. Thus an effective transmission of the feedback information of the channel group can be realized based on these time information. Since the time indicated by the time information field in the preceding first DCI is allowed to be updated through the succeeding second DCI, more flexible feedback is realized.

In an embodiment, the time information field in the second DCI is used to indicate a second time unit, where the processing unit 620 is specifically configured to: determine to transmit the feedback information of the channel group on the second time unit, where the feedback information of the channel group transmitted on the second time unit includes feedback information of the downlink channel corresponding to the first DCI and feedback information of the downlink channel corresponding to the second DCI.

In an embodiment, the time information field in the first DCI is used to indicate a first time unit, where the processing unit 620 is specifically configured to: determine whether to transmit the feedback information of the channel group on the first time unit according to a time interval between a time resource used for receiving the second DCI and the first time unit, where the time resource is located before the first time unit.

In an embodiment, the processing unit 620 is specifically configured to perform at least one of: if the time interval is less than a preset value, determining to transmit the feedback information of the channel group on the first time unit, where the feedback information of the channel group transmitted on the first time unit includes the feedback information of the downlink channel corresponding to the first DCI; or if the time interval is greater than or equal to a preset value, determining not to transmit the feedback information of the channel group on the first time unit.

In an embodiment, the time information field in the first DCI is used to indicate a first time unit, where the processing unit 620 is specifically configured to: determine whether to transmit the feedback information of the channel group on the first time unit according to a time interval between a time resource used for receiving the second DCI and the first time unit, where the time resource is located before the first time unit.

In an embodiment, the processing unit 620 is specifically configured to perform at least one of: if the time interval is less than a preset value, determining to transmit the feedback information of the channel group on the first time unit, where the feedback information of the channel group transmitted on the first time unit includes the feedback information of the downlink channel corresponding to the first DCI; or if the time interval is greater than or equal to a preset value, determining not to transmit the feedback information of the channel group on the first time unit.

In an embodiment, the feedback information of the channel group further includes feedback information of downlink channels that are located before the first DCI and belong to the channel group.

In an embodiment, the downlink channel corresponding to the first DCI includes a downlink channel scheduled by the first DCI or a downlink channel for transmitting the first DCI, and the downlink channel corresponding to the second DCI includes a downlink channel scheduled by the second DCI or a downlink channel for transmitting the second DCI.

It should be understood that the terminal device 600 can perform the corresponding operations performed by the terminal device in the method 200. For brevity, details are not described herein again.

Figure 7:
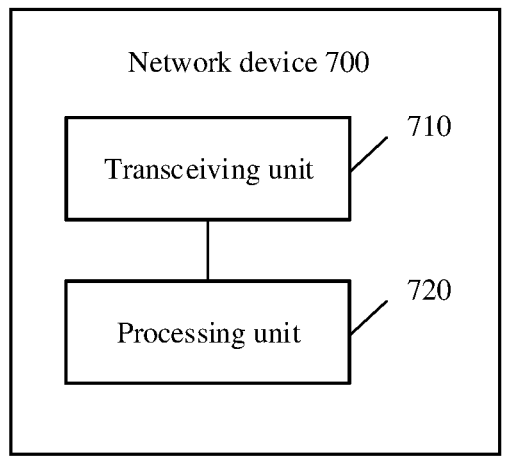
FIG. 7 is a schematic block diagram of a network device according to an embodiment of the present disclosure.

FIG. 7 is a schematic block diagram of a network device 700 according to an embodiment of the present disclosure. As shown in FIG. 7, the network device 700 includes a transceiving unit 710 and a processing unit 720.

The transceiving unit 710 is configured to transmit first DCI.

The transceiving unit 710 is further configured to transmit second DCI after the first DCI, where a downlink channel corresponding to the first DCI and a downlink channel corresponding to the second DCI belong to a same channel group, and each of the first DCI and the second DCI includes a time information field, the time information field is used to indicate a time for transmitting feedback information of the channel group, a time indicated by the time information field in the first DCI is different from a time indicated by the time information field in the second DCI.

The processing unit 720 is configured to determine according to the second DCI, time information for receiving the feedback information of the channel group.

Therefore, when a downlink channel corresponding to first DCI and a downlink channels corresponding to second DCI that are transmitted sequentially belong to a same channel group, and the time indicated by the time information field in the first DCI is different from the time indicated by the time information field in the second DCI, time information of transmitting the feedback information of the channel group can be determined based on the second DCI. Thus, an effective transmission of the feedback information of the channel group is realized according to the time information. Since the time indicated by the time information field in the preceding first DCI is allowed to be updated through the succeeding second DCI, more flexible feedback is realized.

In an embodiment, the time information field in the second DCI is used to indicate a second time unit, where the processing unit 720 is specifically configured to: determine to receive the feedback information of the channel group on the second time unit, where the feedback information of the channel group received on the second time unit includes feedback information of the downlink channel corresponding to the first DCI and feedback information of the downlink channel corresponding to the second DCI.

In an embodiment, the time information field in the first DCI is used to indicate a first time unit, where the processing unit 720 is specifically configured to: determine whether to receive the feedback information of the channel group on the first time unit according to a time interval between a time resource used for transmitting the second DCI and the first time unit, where the time resource is located before the first time unit.

In an embodiment, the processing unit 720 is specifically configured to perform at least one of: if the time interval is less than a preset value, determining to receive the feedback information of the channel group on the first time unit, where the feedback information of the channel group transmitted on the first time unit includes the feedback information of the downlink channel corresponding to the first DCI; or if the time interval is greater than or equal to a preset value, determining not to receive the feedback information of the channel group on the first time unit.

In an embodiment, the time information field in the first DCI is used to indicate a first time unit, where the processing unit 720 is specifically configured to: determine whether to receive the feedback information of the channel group on the first time unit according to a time interval between a time resource used for receiving the second DCI and the first time unit, where the time resource is located before the first time unit.

In an embodiment, the processing unit 720 is specifically configured to perform at least one of: if the time interval is less than a preset value, determining to receive the feedback information of the channel group on the first time unit, where the feedback information of the channel group received on the first time unit includes the feedback information of the downlink channel corresponding to the first DCI; or if the time interval is greater than or equal to a preset value, determining not to receive the feedback information of the channel group on the first time unit.

In an embodiment, the feedback information of the channel group further includes feedback information of a downlink channel that is located before the first DCI and belongs to the channel group.

In an embodiment, the downlink channel corresponding to the first DCI includes a downlink channel scheduled by the first DCI or a downlink channel for transmitting the first DCI, and the downlink channel corresponding to the second DCI includes a downlink channel scheduled by the second DCI or a downlink channel for transmitting the second DCI.

It should be understood that the network device 700 can perform the corresponding operations performed by the network device in the method 200. For brevity, details are not described herein again.

Figure 8:
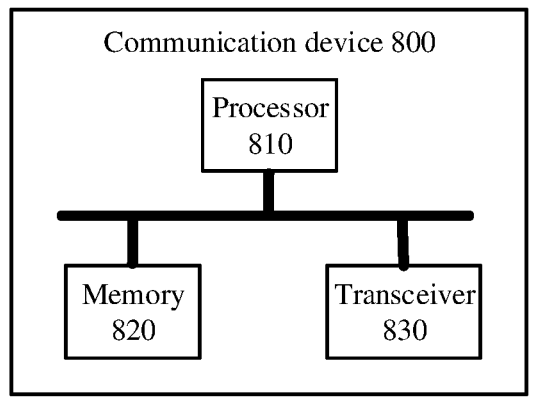
FIG. 8 is a schematic structural diagram of a communication device according to an embodiment of the present disclosure.

FIG. 8 is a schematic structural diagram of a communication device 800 according to an embodiment of the present disclosure. The communication device 800 shown in FIG. 8 includes a processor 810, and the processor 810 can invoke and run computer programs from the memory to implement the method in the embodiment of the present disclosure.

In an embodiment, as shown in FIG. 8, the communication device 800 may further include a memory 820. The processor 810 can invoke and run computer programs from the memory 820 to implement the method in the embodiment of the present disclosure.

The memory 820 may be a separate device independent of the processor 810, or may be integrated in the processor 810.

In an embodiment, as shown in FIG. 8, the communication device 800 may further include a transceiver 830, and the processor 810 may control the transceiver 830 to communicate with other devices. Specifically, the transceiver 830 may transmit information or data to other devices, or receive information or data transmitted by other devices.

The transceiver 830 may include a transmitter and a receiver. The transceiver 830 may further include an antenna, and the number of the antenna may be one or more.

In an embodiment, the communication device 800 may specifically be a terminal device of an embodiment of the present disclosure, and the communication device 800 may implement the corresponding process implemented by the terminal device in each method of the embodiment of the present disclosure. For brevity, details are not described herein again.

In an embodiment, the communication device 800 may specifically be a network device in an embodiment of the present disclosure, and the communication device 800 may implement corresponding processes implemented by the network device in each method in the embodiments of the present disclosure. For brevity, details are not described herein again.

Figure 9:
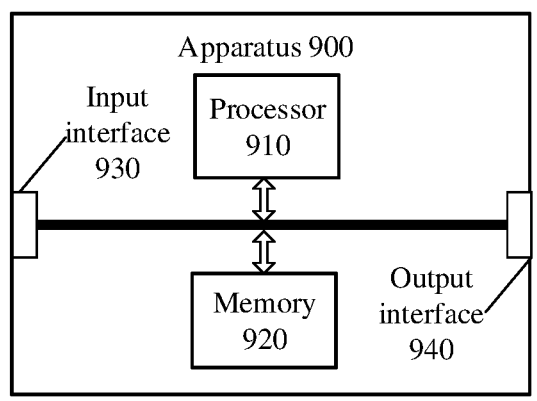
FIG. 9 is a schematic structural diagram of an apparatus for information feedback according to an embodiment of the present disclosure.

FIG. 9 is a schematic structural diagram of an apparatus for information feedback according to an embodiment of the present disclosure. The apparatus 900 shown in FIG. 9 includes a processor 910, and the processor 910 can invoke and run computer programs from the memory to implement the method in the embodiment of the present disclosure.

In an embodiment, as shown in FIG. 9, the apparatus 900 may further include a memory 920. The processor 910 can invoke and run computer programs from the memory 920 to implement the method in the embodiment of the present disclosure.

The memory 920 may be a separate device independent of the processor 910, or may be integrated in the processor 910.

In an embodiment, the apparatus 900 may further include an input interface 930. The processor 910 can control the input interface 930 to communicate with other devices or chips, and specifically, can obtain information or data transmitted by other devices or chips.

In an embodiment, the apparatus 900 may further include an output interface 940. The processor 910 can control the output interface 940 to communicate with other devices or chips, and specifically, the output interface 940 can output information or data to other devices or chips.

In an embodiment, the apparatus 900 may be applied to the network device in the embodiments of the present disclosure, and the communication apparatus may implement the corresponding processes implemented by the network device in the various methods of the embodiments of the present disclosure. For brevity, details are not described herein again.

In an embodiment, the apparatus 900 may be applied to the terminal device in the embodiment of the present disclosure, and the communication apparatus may implement the corresponding process implemented by the terminal device in each method of the embodiment of the present disclosure. For brevity, details are not described herein again.

In an embodiment, the apparatus 900 may be a chip. The chip may also be referred to as a system-level chip, a system chip, a chip system, or a system-on-chip, etc.

The processor of the embodiment of the disclosure may be an integrated circuit chip with signal processing capability. In the implementation process, the operations of the foregoing method embodiments may be completed by instructions in the form of software or the integrated logic circuits of the hardware in the processor. The above-mentioned processor may be a general-purpose processor, a digital signal processor (DSP), an application specific integrated circuit (ASIC), a field programmable gate array (FPGA) or other programming logic devices, discrete gates or transistor logic devices, or discrete hardware components. The methods, operations, and logical block diagrams disclosed in the embodiments of the disclosure may be implemented or executed. The general-purpose processor may be a microprocessor or the processor may further be any conventional processor or the like. The operations of the method disclosed in the embodiments of the disclosure may be directly embodied as being executed and completed by a hardware decoding processor, or executed and completed by a combination of hardware and software modules in the decoding processor. The software module may be located in a mature storage medium in the field such as a random access memory, a flash memory, a read-only memory, a programmable read-only memory, or an electrically erasable programmable memory or a register. The storage medium is located in the memory, and the processor reads the information in the memory and completes the operations of the above-mentioned method in combination with its hardware.

The memory in the embodiment of the disclosure may be a volatile memory or a non-volatile memory, or may include both volatile and non-volatile memory. Among them, the non-volatile memory may be a read-only memory (ROM), a programmable ROM (PROM), an erasable PROM (EPROM), an electrically EPROM (EEPROM) or a flash memory. The volatile memory may be a random access memory (RAM), which is used as an external cache. By way of exemplary but not restrictive description, many forms of RAM are available, such as static RAMs (SRAM), dynamic RAMs (DRAM), synchronous DRAMs (SDRAM), double data rate SDRAMs (DDR SDRAM), enhanced SDRAMs (ESDRAM), synchlink DRAMs (SLDRAM)) and direct rambus RAMs (DR RAM).

The foregoing memory is exemplary but not restrictive. For example, the memory in the embodiment of the disclosure may further be a static RAM (SRAM), a dynamic RAM (DRAM), a synchronous DRAM (SDRAM), a double data rate SDRAM (DDR SDRAM), an enhanced SDRAM (ESDRAM), a synch link DRAM (SLDRAM) or a direct rambus RAM (DR RAM), etc. That is to say, the memory in the embodiments of the disclosure is intended to include but is not limited to these and any other suitable types of memory.

Figure 10:
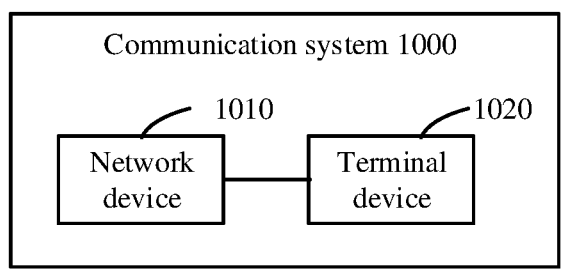
FIG. 10 is a schematic block diagram of a communication system according to an embodiment of the present disclosure.

FIG. 10 is a schematic block diagram of a communication system 1000 according to an embodiment of the present disclosure. As shown in FIG. 10, the communication system 1000 includes a network device 1010 and a terminal device 1020.

The network device 1010 is configured to: transmit first DCI. The network device transmits second DCI after the first DCI, where the downlink channel corresponding to the first DCI and the downlink channel corresponding to the second DCI belong to the same channel group. The network device determines time information for receiving feedback information of the channel group according to the second DCI.

The terminal device 1020 is configured to: receive first DCI; receive second DCI after the first DCI, where the downlink channel corresponding to the first DCI and the downlink channel corresponding to the second DCI belong to the same channel group; and determine time information used for transmitting feedback information of the channel group according to the second DCI.

Each of the first DCI and the second DCI includes a time information field, the time information field is used to indicate time information for transmitting feedback information of the channel group, a time indicated by the time information field in the first DCI is different from a time indicated by the time information field in the second DCI.

The network device 1010 may be configured to implement the corresponding functions implemented by the network device in the method shown in FIG. 2, and the composition of the network device 1010 may be as shown in the network device 700 in FIG. 7. For brevity, details are not described herein again.

The terminal device 1020 may be configured to implement the corresponding functions implemented by the terminal device in the method shown in FIG. 2, and the composition of the terminal device 1020 may be as shown in the terminal device 600 in FIG. 6. For brevity, details are not described herein again.

The embodiments of the present disclosure further provide a computer-readable storage medium for storing computer programs. In an embodiment, the computer-readable storage medium can be applied to the terminal device in the embodiment of the present disclosure, and the computer programs cause a computer to execute the corresponding process implemented by the terminal device in each method of the embodiment of the present disclosure. For brevity, details are not described herein again. In an embodiment, the computer-readable storage medium can be applied to the network device in the embodiment of the present disclosure, and the computer programs cause a computer to execute the corresponding process implemented by the network device in each method of the embodiment of the present disclosure. For brevity, details are not described herein again.

The embodiments of the present disclosure further provide a computer program product including computer program instructions. In an embodiment, the computer program product can be applied to the terminal device in the embodiment of the present disclosure, and the computer program instructions cause a computer to execute the corresponding process implemented by the terminal device in each method of the embodiment of the present disclosure. For brevity, details are not described herein again. In an embodiment, the computer program product can be applied to the network device in the embodiment of the present disclosure, and the computer program instructions cause a computer to execute the corresponding process implemented by the network device in each method of the embodiment of the present disclosure. For brevity, details are not described herein again.

The embodiment of the present disclosure further provides computer programs. In an embodiment, the computer programs can be applied to the terminal device in the embodiment of the present disclosure. When the computer programs are running on a computer, the computer is caused to execute the corresponding process implemented by the terminal device in each method of the embodiment of the present disclosure. For brevity, details are not described herein again. In an embodiment, the computer programs can be applied to the network device in the embodiment of the present disclosure. When the computer programs are running on a computer, the computer is caused to execute the corresponding process implemented by the network device in each method of the embodiment of the present disclosure. For brevity, details are not described herein again.

The terms "system" and "network" in the embodiments of the present disclosure are often used interchangeably herein. The term "and/or" in this article is only an association relationship describing the associated objects, which means that there can be three kinds of relationships, for example, A and/or B, which can mean: A alone exists, A and B exist at the same time, exist alone B these three situations. In addition, the character "/" in this text generally is used to indicate that the associated objects before and after are in an "or" relationship.

In the embodiment of the present disclosure, "B corresponding to A" means that B is associated with A, and B can be determined according to A. However, it should also be understood that determining B based on A does not mean that B is determined only based on A, but the B can also be determined based on A and/or other information.

A person of ordinary skill in the art may be aware that the units and algorithm operations of the examples described in combination with the embodiments disclosed herein can be implemented by electronic hardware or a combination of computer software and electronic hardware. Whether these functions are executed by hardware or software depends on the specific application and design constraint conditions of the technical solution. Professionals and technicians can use different methods for each specific application to implement the described functions, but such implementation should not be considered beyond the scope of the present disclosure.

Those skilled in the art may clearly understand that, for the convenience and conciseness of the description, the specific working process of the above-described system, apparatus and unit may refer to the corresponding procedures in the foregoing method embodiments, which will not be repeated here.

In the several embodiments provided by the disclosure, it should be understood that the disclosed system, apparatus and method may be implemented in other ways. For example, the apparatus embodiments described above are only illustrative. For example, the division of the units is only a logical function division, and there may be other divisions in actual implementation. For example, multiple units or components may be combined or integrated into another system, or some features may be ignored or not implemented. In addition, the displayed or discussed mutual coupling or direct coupling or communication connection may be indirect coupling or communication connection through some interfaces, apparatuses or units, and may be in electrical, mechanical or other forms.

The units described as separate components may or may not be physically separated, and the components displayed as units may or may not be physical units, that is, they may be located in one place, or they may be distributed on multiple network units. Some or all of the units may be selected according to actual needs to achieve the objectives of the solutions of the present embodiments.

In addition, the functional units in each embodiment of the disclosure may be integrated into one processing unit, or each unit may exist separately and physically, or two or more units may be integrated into one unit.

If the function is implemented in the form of a software functional unit and is sold or used as an independent product, it can be stored in a computer readable storage medium. Based on such an understanding, the technical solution of the disclosure or the part that contributes to the related art or the part of the technical solution may be embodied in the form of a software product essentially, and the computer software product is stored in a storage medium including several instructions to make a computer device (which may be a personal computer, a server or a network device, etc.) execute all or part of the operations of the methods described in the each embodiment of the disclosure. The aforementioned storage medium includes: U disks, mobile hard disks, read-only memories (ROM), random access memories (RAM), magnetic disks or optical disks and other media that can store program codes.

Based on the above technical solution, when a downlink channel corresponding to first DCI and a downlink channels corresponding to second DCI that are transmitted sequentially belong to a same channel group, and the time indicated by the time information field in the first DCI is different from the time indicated by the time information field in the second DCI, time information of transmitting the feedback information of the channel group can be determined based on the second DCI. Thus, an effective transmission of the feedback information of the channel group is realized according to the time information. Since the time indicated by the time information field in the preceding first DCI is allowed to be updated through the succeeding second DCI, more flexible feedback is realized.

The foregoing is only the specific implementation mode of the disclosure. However, the protection scope of the disclosure is not limited thereto. Any variations or replacements apparent to those skilled in the art within the technical scope disclosed by the present disclosure shall fall within the protection scope of the present disclosure. Therefore, the protection scope of the disclosure shall be subject to the protection scope of the claims.

The invention claimed is:

1. A method for information feedback, comprising:
receiving, by a terminal device, first Downlink Control Information (DCI);
receiving, by the terminal device, second DCI after the first DCI, wherein a downlink channel corresponding to the first DCI and a downlink channel corresponding to the second DCI belong to a same channel group, and each of the first DCI and the second DCI comprises a time information field, the time information field is used to indicate a time for transmitting feedback information of the channel group, a value indicated by the time information field in the first DCI is an invalid value, and the time information field in the second DCI is used to indicate a second time unit; and
determining, by the terminal device, to transmit the feedback information of the channel group on the second time unit, wherein the feedback information of the channel group transmitted on the second time unit comprises feedback information of the downlink channel corresponding to the first DCI and feedback information of the downlink channel corresponding to the second DCI.

2. The method of claim 1, wherein the feedback information of the channel group further comprises feedback information of a downlink channel that is located before the first DCI and belongs to the channel group.

3. The method of claim 1, wherein the downlink channel corresponding to the first DCI comprises a downlink channel scheduled by the first DCI or a downlink channel for transmitting the first DCI, and the downlink channel corresponding to the second DCI comprises a downlink channel scheduled by the second DCI or a downlink channel for transmitting the second DCI.

4. A terminal device, comprising:
a transceiver, configured to receive first Downlink Control Information (DCI);
wherein the transceiver is further configured to receive second DCI after the first DCI, wherein a downlink channel corresponding to the first DCI and a downlink channel corresponding to the second DCI belong to a same channel group, and each of the first DCI and the second DCI comprises a time information field, the time information field is used to indicate a time for transmitting feedback information of the channel group, a value indicated by the time information field in the first DCI is an invalid value, and the time information field in the second DCI is used to indicate a second time unit; and
a processor, configured to determine to transmit the feedback information of the channel group on the second time unit, wherein the feedback information of the channel group transmitted on the second time unit comprises feedback information of the downlink channel corresponding to the first DCI and feedback information of the downlink channel corresponding to the second DCI.

5. The terminal device of claim 4, wherein the feedback information of the channel group further comprises feedback information of a downlink channel that is located before the first DCI and belongs to the channel group.

6. The terminal device of claim 4, wherein the downlink channel corresponding to the first DCI comprises a downlink channel scheduled by the first DCI or a downlink channel for transmitting the first DCI, and the downlink channel corresponding to the second DCI comprises a downlink channel scheduled by the second DCI or a downlink channel for transmitting the second DCI.

7. A network device, comprising:
a transceiver, configured to transmit first Downlink Control Information (DCI);
wherein the transceiver is further configured to transmit second DCI after the first DCI, wherein a downlink channel corresponding to the first DCI and a downlink channel corresponding to the second DCI belong to a same channel group, and each of the first DCI and the second DCI comprises a time information field, the time information field is used to indicate a time for transmitting feedback information of the channel group, a value indicated by the time information field in the first DCI is an invalid value, and the time information field in the second DCI is used to indicate a second time unit; and
a processor, configured to determine to receive the feedback information of the channel group on the second time unit, wherein the feedback information of the channel group received on the second time unit comprises feedback information of the downlink channel corresponding to the first DCI and feedback information of the downlink channel corresponding to the second DCI.

8. The network device of claim 7, wherein the feedback information of the channel group further comprises feedback information of a downlink channel that is located before the first DCI and belongs to the channel group.

9. The network device of claim 7, wherein the downlink channel corresponding to the first DCI comprises a downlink channel scheduled by the first DCI or a downlink channel for transmitting the first DCI, and the downlink channel corresponding to the second DCI comprises a downlink channel scheduled by the second DCI or a downlink channel for transmitting the second DCI.

* * * * *